United States Patent
Magnus

(10) Patent No.: US 6,547,031 B1
(45) Date of Patent: Apr. 15, 2003

(54) FRONT WHEEL STEERING VARIABLE CONTROL ACTUATOR

(75) Inventor: Brian J. Magnus, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/981,598

(22) Filed: Oct. 16, 2001

(51) Int. Cl.⁷ .................................................. B60T 8/24
(52) U.S. Cl. ........................ 180/444; 180/446; 192/12 B
(58) Field of Search ........................... 188/444, 446, 188/443, 447; 701/41; 192/12 B, 17 R

(56) References Cited

U.S. PATENT DOCUMENTS

| 4,458,795 A | * | 7/1984 | Norton ....................... 192/43.2 |
| 4,494,636 A | | 1/1985 | Wakabayashi et al. ..... 192/41 A |
| 4,726,437 A | * | 2/1988 | Norton ....................... 180/79.1 |
| 4,819,170 A | | 4/1989 | Shimizu .................. 364/424.05 |
| 4,852,707 A | * | 8/1989 | Ito et al. ......................... 192/44 |
| 5,265,019 A | | 11/1993 | Harara et al. ........... 364/424.05 |
| 5,743,351 A | | 4/1998 | McLaughlin ................. 180/446 |
| 5,899,294 A | * | 5/1999 | Shimizu et al. .............. 180/444 |
| 6,148,977 A | * | 11/2000 | Backmak ....................... 192/37 |
| 6,442,469 B1 | * | 8/2002 | Matsuno ........................ 701/70 |

* cited by examiner

Primary Examiner—Lesley D. Morris
Assistant Examiner—Tony Winner
(74) Attorney, Agent, or Firm—Edmund P. Anderson

(57) ABSTRACT

A variable control steering actuator for mechanically adjusting an angle of the steerable wheel of a motor vehicle includes a controller, a braking device in operable communication with the controller, and a clutch device associated with the braking device. The clutch device is disposed on an input pinion of the steering shaft. The input pinion is in operable mechanical communication with the steerable wheel through both the clutch device and the braking device. A method for mechanically adjusting the angle of the steerable wheel of the vehicle in order to control the vehicle includes disengaging the clutch device and rotating the steering shaft independently of an input from an operator of the vehicle. The rotation of the steering shaft may be effectuated through a motor disposed in operable communication with the steering shaft.

27 Claims, 2 Drawing Sheets

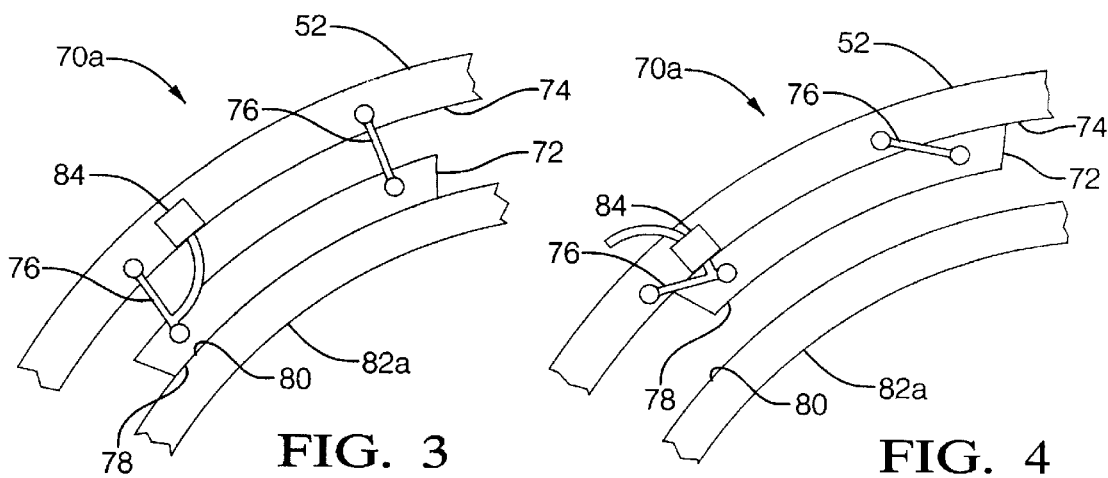
FIG. 3
FIG. 4
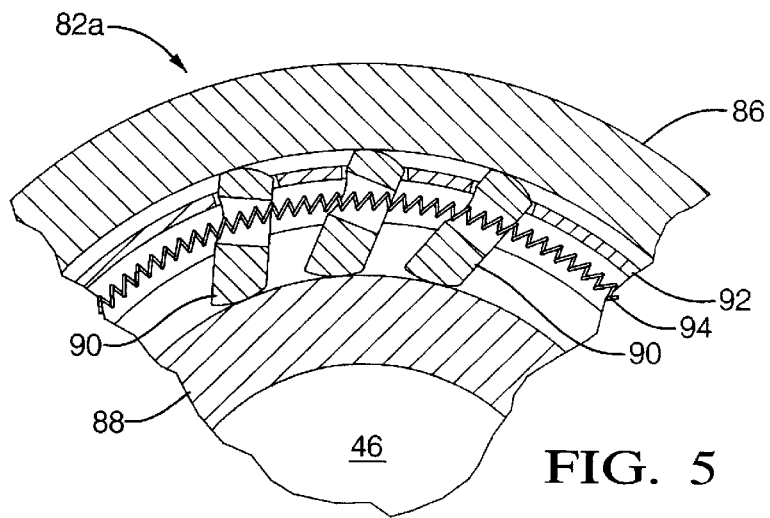
FIG. 5
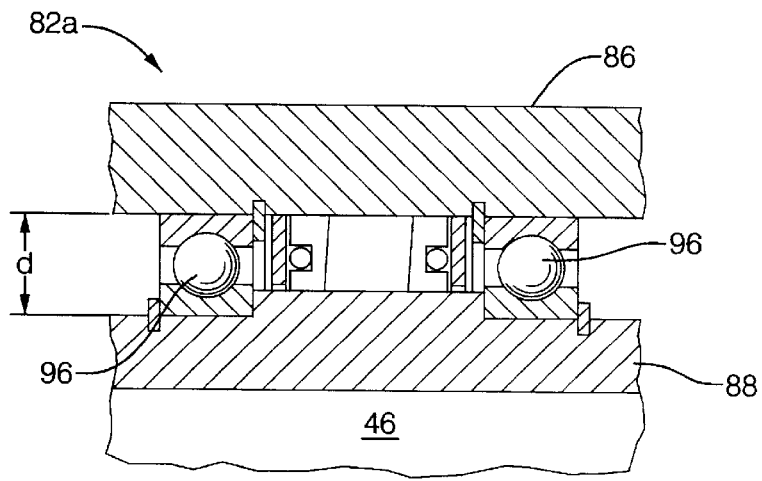
FIG. 6

FRONT WHEEL STEERING VARIABLE CONTROL ACTUATOR

BACKGROUND

Motor vehicle handling instabilities are generally a function of a combination of the yaw rate and lateral acceleration of the motor vehicle and the motor vehicle speed. Such instabilities may result in an oversteer or an understeer condition being experienced by the vehicle. The encounter of the motor vehicle with such a condition generally provides less than optimal handling of the motor vehicle.

Various arrangements for compensating for oversteer and understeer of motor vehicles have been attained by relating the yaw behavior of the motor vehicle to the braking function. One particular arrangement involves the comparison of a vehicle yaw angular velocity required value and an actual vehicle yaw angular velocity of the motor vehicle. In such an arrangement, the required value and the actual yaw rate are measured, and the difference is minimized through the application of independent braking.

SUMMARY

A variable control steering actuator for mechanically adjusting an angle of the steerable wheels of a motor vehicle and a method for compensating for an oversteer or understeer condition in the operation of a motor vehicle are described herein. The variable control steering actuator includes a controller, a braking device in operable communication with the controller, and a clutch device associated with the braking device. The clutch device is disposed on an input pinion of the steering shaft. The input pinion is in operable mechanical communication with the steerable wheel through both the clutch device and the braking device.

The method for mechanically adjusting an angle of the steerable wheels of the motor vehicle in order to control the motor vehicle includes disengaging the clutch device disposed between the input pinion and the upper portion of the steering shaft and rotating the steering shaft independently of an input from an operator of the motor vehicle. The rotation of the steering shaft may be effectuated through a drive motor disposed in operable communication with the steering shaft and in informational communication with the controller.

BRIEF DESCRIPTION OF THE DRAWINGS

FIG. 3 is a cross sectional view of a portion of a variable control steering actuator showing a braking device engaged with a clutch.

FIG. 4 is a cross sectional view of a portion of a variable control steering actuator showing a braking device disengaged from a clutch.

FIG. 5 is a cross sectional view of a portion of a clutch.

FIG. 6 is a side cross sectional view of a portion of a clutch.

DETAILED DESCRIPTION

Figure 1:
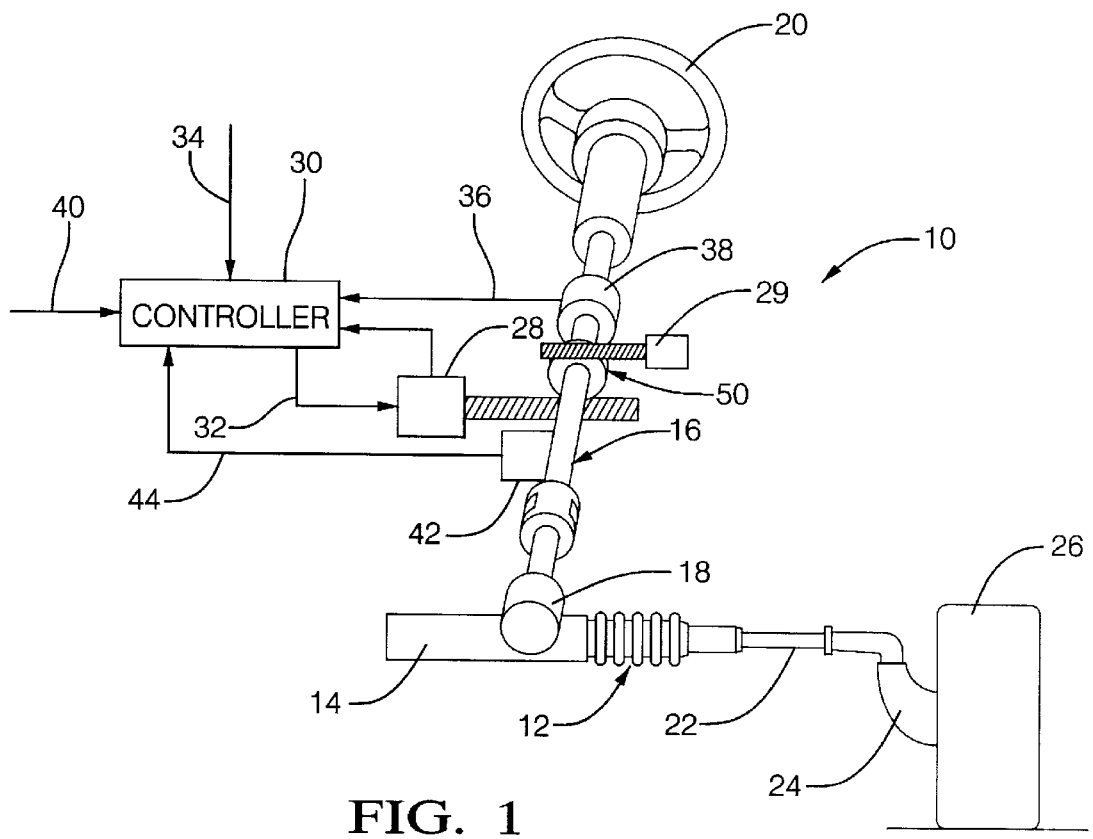
FIG. 1 is a schematic representation of a power steering system of a motor vehicle.

Referring to FIG. 1, a power steering system incorporable into a motor vehicle is shown generally at 10. Power steering system 10 comprises a system for the stability control of the motor vehicle and a conventional rack and pinion steering mechanism, shown generally at 12. Rack and pinion steering mechanism 12 includes a toothed rack 14 and an output pinion (shown below with reference to FIG. 2) disposed on an end of a steering shaft, shown generally at 16. The output pinion is housed within a gear housing 18. A hand steering device 20 is accessible by an operator (not shown) of the motor vehicle and is disposed on an end of steering shaft 16 opposite the end on which the output pinion is disposed. Hand steering device 20 may be a steering wheel, as is shown. Upon rotation of hand steering device 20, steering shaft 16 rotates to turn the output pinion. Rotation of the output pinion causes the lateral translation of toothed rack 14 thereacross, which in turn moves tie rods 22 (only one of which is shown), each of which move steering knuckles 24 (only one of which is shown), thereby effectuating the movement of at least one steerable wheel 26 to steer the motor vehicle.

Stability control of the motor vehicle is provided to power steering system 10 through a drive motor 28 and a variable control steering actuator, shown generally at 50, disposed on steering shaft 16 and in operable communication with drive motor 28. In addition to providing the stability control, variable control steering actuator 50 provides for an infinitely variable steering ratio of the motor vehicle. Drive motor 28 may be electrically powered. A controller 30 disposed in informational communication with drive motor 28 receives input signals from various sensors operably mounted in the motor vehicle and provides an output signal 32 to the power assist actuator. The input signals to controller 30 include a vehicle velocity signal 34 from a vehicle velocity sensor (not shown), a steering shaft angle signal 36 from a first rotational position sensor 38, a steering pinion gear angle signal 44 from a second rotational position sensor 42, a yaw angular velocity signal 40 from a yaw rate sensor (not shown), and a lateral acceleration signal from a lateral accelerometer (not shown). Controller 30 receives vehicle velocity signal 34, yaw angular velocity signal 40, the lateral acceleration signal, steering shaft angle signal 36, and steering pinion gear angle signal 44. Upon an analysis and quantification of signals 34, 36, 40, 44, a transducer portion (not shown) of controller 30 derives output signal 32, which ultimately effectuates the manipulation of power steering system 10 through drive motor 28 by autonomously changing the angle of the steerable wheels 26, thereby maintaining the stability of the motor vehicle, beyond which an oversteer or understeer condition may be experienced. A feedback motor 29 is disposed in operable communication with upper part of steering shaft 16 on the input side of variable control steering actuator 50. Controller 30 derives output signal 47, which effectuates the manipulation of steering shaft 16 to provide resistance to the torque applied to hand steering device 20 by the operator when variable control steering actuator 50 is actuated. Such resistance provides a simulated road feel to the operator that mimics the road feel experience by the motor vehicle but is not transferred to the operator due to the operation of variable control steering actuator 50.

Figure 2:
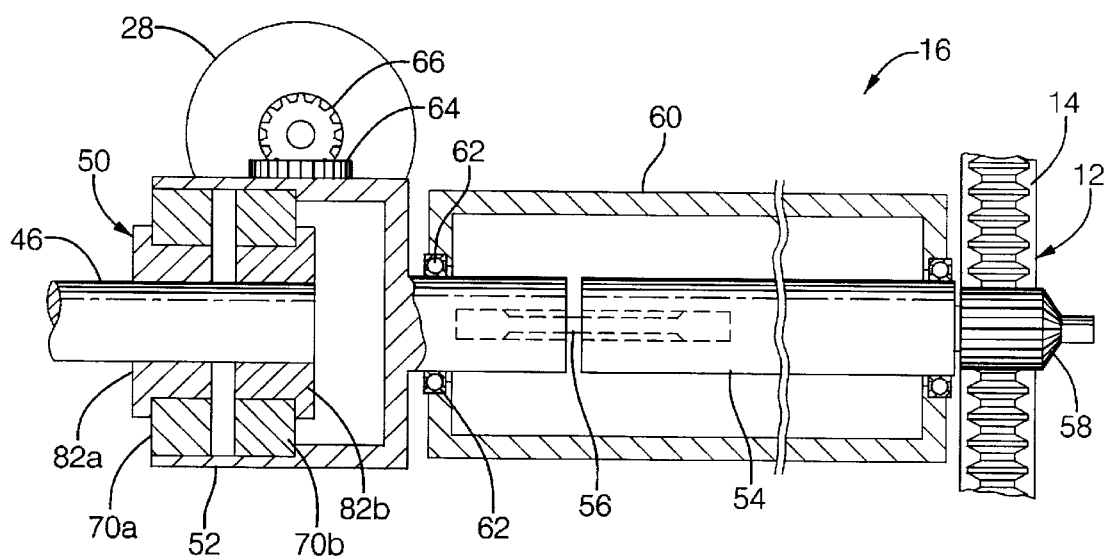
FIG. 2 is a schematic representation of a steering shaft of a motor vehicle incorporating a variable control steering actuator.

Referring now to FIG. 2, steering shaft 16 is shown in greater detail. Steering shaft 16 comprises an upper control shaft 46, the variable control steering actuator as shown generally at 50, and a lower steering shaft 52. Upper control shaft 46 is connected at one end thereof to the hand steering device. An opposing end of upper control shaft 46 is in mechanical communication with a first end of lower steering shaft 52 through variable control steering actuator 50, and a second end of lower steering shaft 52 is in mechanical communication with the output pinion, shown at 58, which is in operable communication with toothed rack 14 of rack and pinion steering mechanism 12. A housing 60 is disposed over lower steering shaft 52 to support lower steering shaft 52 and output pinion 58 in general. Bearings 62 are disposed between housing 60 and lower steering shaft 52 to facilitate the rotation of lower steering shaft 52.

Lower steering shaft 52 includes a ring gear 64 disposed concentrically about an outer surface thereof Ring gear 64 is configured, positioned, and dimensioned to provide operable communication between variable control steering actuator 50, lower steering shaft 52, and drive motor 28 through a worm 66 disposed on the rotor shaft of drive motor 28. Ring gear 64 and worm 66 define a worm/worm gear interface configured to include forward-drive and reverse-drive efficiency sufficient to allow for back-driveability of steering shaft 16.

Variable control steering actuator 50 is defined by an arrangement of one-way clutches 82*a*, 82*b* and correspondingly associated braking devices 70*a*, 70*b*. The configuration of variable control steering actuator 50 provides for the variable transmission of torque between upper control shaft 46 and lower steering shaft 52. The incorporation of the dual one-way clutches 82*a*, 82*b* and associated braking devices 70*a*, 70*b* enable the torque to be generated in exclusively opposing angular directions.

Referring now to FIGS. 3 through 6, the componentry of the variable control steering actuator is shown in detail. In FIGS. 3 and 4, one of the braking devices is shown generally at 70*a*. The other braking device is substantially similar in construction. Although braking device 70*a* is depicted as being of a particular configuration, it should be understood that any braking device capable of providing braking action to the steering shaft may be incorporated into the variable control steering actuator. Braking device 70*a* comprises a brake shoe 72 pivotally mounted to an inner surface 74 of upper shaft 52. The mounting of brake shoe 72 to inner surface 74 is effectuated through the use of at least one link pin 76. A contact surface 78 of brake shoe 72 is dimensioned to substantially correspond to a contact surface 80 of a clutch (shown generally at 82*a*) for which braking device 70*a* radially provides braking force. A brake actuating device 84 is disposed in mechanically operable communication with at least one link pin 76 to effectuate the movement of brake shoe 72 between a position wherein brake shoe 72 is "locked" or engaged with a corresponding clutch 82*a*, as is shown in FIG. 3, or wherein brake shoe 72 is disengaged from its corresponding clutch 82*a*, as is shown in FIG. 4.

In FIGS. 5 and 6, one of the clutches is shown in detail generally at 82*a*. The other clutch is substantially similar in construction. Although clutch 82*a* is depicted as being of a particular configuration, it should be understood that any clutch device capable of providing clutch action to the steering shaft may be incorporated into the variable control steering actuator. Clutch 82*a* is configured to be a one-way clutch device capable of providing axial rotation of input pinion 46 and the upper steering shaft in one direction only when the braking device is engaged. As shown in FIG. 5, clutch 82*a* comprises an outer ring 86 and an inner ring 88. Inner ring 88 is disposed concentrically and rotatably on the outside diameter of upper control shaft 46. Sprags 90 are pivotally mounted between outer ring 86 and inner ring 88 such that upon movement of one of the rings about the other, sprags 90 either catch the surface of inner ring 88 and lock between outer ring 86 and inner ring 88 or are dragged across the surface of inner ring 88. A sprag ring 92, which is punched with through-holes about the circumference thereof, may be concentrically mounted between inner ring 88 and outer ring 86, and sprags 90 may be disposed within the through-holes disposed in sprag ring 92 to maintain spaced intervals between sprags 90. Retaining elements 94 are disposed laterally adjacent to the arrangement of sprags 90 to aid sprag ring 92 in maintaining lateral alignment of sprags 90 within the arrangement of rings 86, 88, 92. As shown, retaining element 94 is a garter spring.

Referring now to FIG. 6, a tangential cutaway view of an edge of clutch 82*a* is shown. Outer ring 86 and inner ring 88 are maintained at a fixed interval d from each other. Bearings 96 are disposed between outer ring 86 and inner ring 88 to facilitate the rotational motion of rings 86, 88 about each other.

Referring to FIGS. 2 through 6, the operation of variable control steering actuator 50 is described. As stated above, variable control steering actuator 50 comprises two clutches 82*a*, 82*b* and corresponding associated braking devices 70*a*, 70*b*. Clutches 82*a*, 82*b* are oriented to allow for free movement of steering shaft 16 in opposing angular directions. During normal operation of the steering of the motor vehicle (i.e., situations in which enhanced steering angle control is not required by the motor vehicle), braking devices 70*a*, 70*b* each engage their corresponding clutches 82*a*, 82*b*. Because braking devices 70*a*, 70*b* are fixedly mounted to inner surface 74 of upper shaft 52 and are in intermittent mechanical communication with clutches 82*a*, 82*b*, which are in turn disposed in mechanical communication with input pinion 46, tactile feedback is maintained between the road wheels and the operator of the motor vehicle through lower steering shaft 54, upper steering shaft 52, the engagement of braking devices 70*a*, 70*b* and clutches 82*a*, 82*b*, input pinion 46, and the hand steering device. When both braking devices 70*a*, 70*b* are engaged, sprags 90 of each clutch 82*a*, 82*b* engage or "lock" between their respective outer rings 86 and inner rings 88. Sprags 90 of the first clutch 82*a* provide a resistance to the turning of the hand steering device in a "locking" direction that is typical of a normal steering operation while sprags 90 of the second clutch 82*b* are at rest. Upon reversal of the direction of the hand steering device during normal operation, the sprags 90 of the second clutch 82*b* engage and provide a resistance to the turning of the hand steering device in the opposing locking direction, while the sprags 90 of the first clutch 82*a* are at rest. When rotating the hand steering device in either direction during normal operation, a turning ratio in which the amount that the hand steering device is rotated corresponds to the amount that the output pinion 58 is rotated in a one-to-one ratio. The steerable wheels are thereby rotated in direct relation to the fixed gear ratio of rack 14 and pinion 58.

Upon detection of an error of the desired vehicle dynamics in relation to the actual vehicle dynamics, variable control steering actuator 50 actuates to minimize the error. Such conditions are indicated by feedback received from yaw rate and lateral accelerometer sensors and the vehicle velocity sensor through the controller. For enhanced steering angle control, one braking device 70*a* is disengaged in response to a signal from the controller, thereby causing its corresponding clutch 82*a* to disengage. During such disengagement, sprags 90 of the corresponding clutch 82*a* disengage from inner ring 88 or "unlock." Upon such unlocking, rotation of the hand steering device in its corresponding direction has limited or no effect on the angling of the steerable wheels. Upon the unlocking of sprags 90, a signal from the yaw rate sensors and the vehicle velocity sensor through the controller causes drive motor 28 to operate to rotate the engaged clutch 82*a* in its appropriate direction, thereby rotating steering shaft 16. Manual rotation of the hand steering device in an opposing direction would meet with the resistance of drive motor 28. Because the torque generated manually is less than the amount of torque generated by drive motor 28, the manual resistance is overcome by the torque of drive motor 28.

Depending upon the magnitude of the signal, drive motor 28 may add road wheel angle to the steerable wheels beyond the road wheel angle commanded by the operator. Likewise, drive motor 28 may subtract road wheel angle from the steerable wheels in the event that the operator utilizes the steering to overcompensate for a yaw condition. During such an addition or subtraction, the effect of the rotation of lower steering shaft 52 by drive motor 28 in the appropriate direction is transparent to the operator. In particular, through the disengagement of one of the clutches and its associated brake, additional or subtracted road angle is used to correct the caused yaw movement of the motor vehicle. Because one of the clutches and its associated brake remain engaged, however, mechanical communication is maintained through the steering linkage connecting the hand steering device and the steerable wheels, thereby allowing tactile feedback to be maintained between the operator and the surface of the road. The transparency of such an operation further enables variable control steering actuator 50 to allow for an infinite variable ratio to be realized between the hand steering wheel and the steerable wheels. Upon interruption of the signal from the sensors to drive motor 28, which may be caused by a sensed correction of yaw movement from the yaw sensors, the disengaged braking device 70*a* re-engages its corresponding clutch 82*a* and normal steering operation is resumed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A steering system for a motor vehicle, the steering system comprising:
   a drive motor; and
   a steering actuator disposed on a steering shaft of the motor vehicle and in communication with said drive motor, said steering actuator being configured to controllably provide a steering angle to a steerable wheel of the motor vehicle in response to a sensed yaw rate and lateral acceleration of the motor vehicle, said steering angle controllably provided by said steering actuator being independent of a steering angle input by an operator of the motor vehicle.

2. The steering system of claim 1 wherein said steering actuator comprises: an arrangement of braking devices and clutches disposed on said steering shaft, said arrangement of braking devices and clutches providing mechanical communication and tactile feedback to said operator of the motor vehicle from said steerable wheel.

3. The steering system of claim 1 wherein control of said steering angle provided by said steering actuator is effectuated through a controller disposed in informational communication with said drive motor.

4. The steering system of claim 1 further comprising a feedback motor disposed in operable communication with said steering shaft, said feedback motor being configured to provide resistance to torque applied to a hand steering device.

5. The steering system of claim 1 wherein the yawed movement of the motor vehicle is sensed through a yaw angular velocity signal from a yaw sensor.

6. The steering system of claim 1 wherein the lateral acceleration of the motor vehicle is sensed through a lateral acceleration signal from a lateral accelerometer.

7. The steering system of claim 1 wherein said steering angle provided to said steerable wheel of the motor vehicle is through a rack and pinion mechanism disposed in operable communication with said operator of the motor vehicle through said steering shaft.

8. A steering system for compensating for a yaw movement of a motor vehicle, the system comprising:
   an operator steering input device;
   a steering linkage connecting said operator steering input device to a steerable wheel of the motor vehicle;
   a yaw sensor disposed in the motor vehicle;
   a controller maintained in operable communication with said yaw sensor;
   a drive motor commandable by said controller, said controller commanding said drive motor in response to a sensed yaw moment of the motor vehicle; and
   a variable steering actuator responsive to input from said drive motor, said variable steering actuator disposed in said steering linkage between said steerable wheel and said operator steering input device.

9. The steering system of claim 8 wherein said drive motor is configured to provide a steering angle to said steerable wheel that is independent of an input from an operator of the motor vehicle.

10. The steering system of claim 8 wherein said steering linkage connecting said input device to a steerable wheel of the motor vehicle is a steering shaft.

11. The steering system of claim 8 wherein said variable steering actuator comprises:
    a braking device disposed on said steering linkage; and
    a clutch device disposed in mechanical communication with said braking device and said steering linkage, said clutch device being configured to be variably actuatable in response to a movement of said braking device.

12. The steering system of claim 11 wherein said variable actuation of said clutch device is effectuated by said drive motor in response to informational communication maintained between said yaw sensor, said controller, and said drive motor.

13. A variable control steering actuator for mechanically adjusting an angle of the steerable wheel of a motor vehicle disposed on a steering shaft of the motor vehicle, the steering actuator comprising:
    a controller;
    a braking device disposed on the steering shaft, said braking device being in operable communication with said controller; and
    a clutch device associated with said braking device, said clutch device being disposed on an input pinion of the steering shaft, said input pinion being in operable mechanical communication with the steerable wheel through said clutch device and said braking device.

14. The steering actuator of claim 13 wherein said braking device comprises:
    a first brake disposed on the steering shaft; and
    a second brake disposed adjacent said first brake on the steering shaft.

15. The steering actuator of claim 14 wherein said clutch device comprises:

a first clutch disposed on said input pinion and being mechanically communicable with said first brake, said first clutch being configured to allow for the axial rotation of said input pinion and the steering shaft in a first direction; and a second clutch disposed adjacent said first clutch on said input pinion and being mechanically communicable with said second brake, said second clutch being configured to allow for the axial rotation of said input pinion and the steering shaft in a second direction.

16. The steering actuator of claim 13 wherein said operable communication between said controller and said braking device is maintained through an assembly comprising:

a drive motor disposed in operable communication with said controller;

a worm axially rotatably disposed on a rotor shaft of said drive motor; and a ring gear disposed on a surface of the steering shaft to which said braking device is communicably attached, said ring gear being in mechanical communication with said worm.

17. A method for compensating for yawed movement of a motor vehicle, comprising:

evaluating an input from a yaw rate sensor;

determining a desired wheel angle of the motor vehicle, said desired wheel angle being indicative of a wheel angle characteristic of an optimum amount of stability possible to the motor vehicle under the conditions to which the motor vehicle is subjected; and adjusting an existing wheel angle of a steerable wheel of the motor vehicle in accordance with said optimum amount of stability to correspond with said desired wheel angle.

18. The method of claim 17 wherein said adjusting of said existing wheel angle of said steerable wheel is effectuated through a system of clutches and brakes disposed on a steering shaft of the motor vehicle.

19. The method of claim 18 wherein said adjusting of said existing wheel angle of said steerable wheel comprises:

disengaging a first braking device of said system of clutches and brakes from a first clutch of said system of clutches and brakes; and rotating said steering shaft in an axial direction in accordance with said determined desired wheel angle.

20. The method of claim 19 wherein said rotating of said steering shaft is effectuated through a drive motor disposed in operably mechanical communication with said steering shaft.

21. The method of claim 19 further comprising: re-engaging said first braking device of said system of clutches and brakes with said first clutch of said system of clutches and brakes.

22. A method of mechanically adjusting an angle of a steerable wheel of a motor vehicle to control the motor vehicle, the method comprising:

disengaging a clutching device disposed between an input pinion of a steering shaft and an output portion of said steering shaft; and rotating said steering shaft independently of an input from an operator of the motor vehicle.

23. The method of claim 22 wherein said rotating of said steering shaft is effectuated through a drive motor disposed in operably mechanical communication with said steering shaft.

24. The method of claim 22 further comprising: re-engaging said clutching device.

25. The method of claim 22 wherein the angle of the steerable wheel is increased relative to a body of the motor vehicle.

26. The method of claim 22 wherein the angle of the steerable wheel is decreased relative to a body of the motor vehicle.

27. The method of claim 22 wherein said disengagement of said clutching device is effectuated through the release of a brake.

* * * * *